United States Patent
Harbs et al.

(10) Patent No.: US 11,154,072 B2
(45) Date of Patent: Oct. 26, 2021

(54) PLANT FOR THE MANUFACTURE AND/OR PREPARATION OF CONFECTIONERY MASSES, AND A METHOD FOR THE CLEANING OF A PLANT FOR THE MANUFACTURE AND/OR PREPARATION OF CONFECTIONERY MASSES

(71) Applicant: NETZSCH-Feinmahltechnik GmbH, Selb (DE)

(72) Inventors: Theron Harbs, Selb (DE); Holger Moeschl, Selb (DE); Lars-Peter Weiland, Schönwald (DE); Sergio Devegili, Pomerode (BR)

(73) Assignee: NETZSCH-Feinmahltechnik GmbH, Selb (DE)

( * ) Notice: Subject to any disclaimer, the term of this patent is extended or adjusted under 35 U.S.C. 154(b) by 656 days.

(21) Appl. No.: 15/222,560

(22) Filed: Jul. 28, 2016

(65) Prior Publication Data
US 2016/0330994 A1  Nov. 17, 2016

Related U.S. Application Data

(63) Continuation of application No. PCT/DE2015/000090, filed on Feb. 26, 2015.

(30) Foreign Application Priority Data

Feb. 26, 2014  (DE) .......................... 102014102529.6

(51) Int. Cl.
*A23G 7/00* (2006.01)
*A23G 1/10* (2006.01)
(Continued)

(52) U.S. Cl.
CPC ............. *A23G 7/0056* (2013.01); *A23G 1/10* (2013.01); *A23G 3/0215* (2013.01);
(Continued)

(58) Field of Classification Search
CPC ...... A23G 7/0006; A23G 7/0056; A23G 9/30; A23G 3/0215; B01F 15/00025; B08B 9/0321; B08B 9/093; B08B 9/0808
(Continued)

(56) References Cited

U.S. PATENT DOCUMENTS 3,663,231 A * 5/1972 Tourell .................... A23G 1/125
99/485
5,865,536 A * 2/1999 Mechias .................. A23G 1/10
134/22.14
(Continued)

FOREIGN PATENT DOCUMENTS

DE 69002057 T2 1/1994
DE 19637098 A1 3/1998
(Continued)

OTHER PUBLICATIONS

Machine translation of JP2010075891, accessed via https://worldwide.espacenet.com/on Jul. 17, 2018.*
(Continued)

*Primary Examiner* — Marc C Howell
(74) *Attorney, Agent, or Firm* — Whitmyer IP Group LLC (57) ABSTRACT

The invention relates to a system for producing and/or preparing confectionery compounds from at least one liquid raw material and granular and/or powder raw materials. The system includes at least one first mixing container and at least one other product-processing device. The first mixing container has at least one raw material inlet, a product outlet, and a mixing device for mixing the raw materials in an at least largely homogenous manner. According to the invention, at least the mixing container includes at least one spray device in an upper container region for introducing the at least one liquid raw material, wherein at least one exit cone of the spray device is oriented in the direction of an inner wall surface of the first mixing container at least in some (Continued)

regions. The invention further relates to a method for cleaning a system for producing and/or preparing confectionery compounds.

20 Claims, 6 Drawing Sheets

(51) Int. Cl.

| | |
|---|---|
| *A23G 3/02* | (2006.01) |
| *B08B 9/093* | (2006.01) |
| *B08B 9/032* | (2006.01) |
| *B01F 3/12* | (2006.01) |
| *B01F 15/00* | (2006.01) |

(52) U.S. Cl.
CPC .......... *A23G 7/0006* (2013.01); *B01F 3/1271* (2013.01); *B01F 15/00025* (2013.01); *B08B 9/0321* (2013.01); *B08B 9/093* (2013.01); *B01F 2215/0019* (2013.01)

(58) Field of Classification Search
USPC ........................................................ 366/138
See application file for complete search history.

(56) References Cited

U.S. PATENT DOCUMENTS

| | | | |
|---|---|---|---|
| 7,794,134 B1 * | 9/2010 | Henry | A23N 17/005 |
| | | | 366/138 |
| 2005/0056707 A1 | 3/2005 | Gowens et al. | |
| 2007/0110864 A1 * | 5/2007 | Galloway | B08B 9/032 |
| | | | 426/512 |

FOREIGN PATENT DOCUMENTS

| | | | |
|---|---|---|---|
| EP | 1779937 A2 | | 5/2007 |
| JP | 2010075891 A | * | 4/2010 |
| JP | 2010075891 A | | 4/2010 |

OTHER PUBLICATIONS

Minifie B.W.: "Chocolate, cacao and confectionery—Science and Technology 2nd ed", 1980, Westport, pp. 113-125 (Abstract only).
International Search Report Application No. PCT/DE2015/000090 Completed: Jun. 22, 2015; dated Jul. 3, 2015 3 pages.
Written Opinion of the International Searching Authority Application No. PCT/DE2015/000090 Completed: Jun. 22, 2015; dated Jul. 3, 2015 7 pages.

* cited by examiner

PLANT FOR THE MANUFACTURE AND/OR PREPARATION OF CONFECTIONERY MASSES, AND A METHOD FOR THE CLEANING OF A PLANT FOR THE MANUFACTURE AND/OR PREPARATION OF CONFECTIONERY MASSES

TECHNICAL FIELD

The present invention concerns a plant for the manufacture and/or preparation of confectionery masses, and a method for the cleaning of such a plant.

BACKGROUND

The invention concerns a plant and a method for the manufacture and/or preparation of confectionery masses. Under "confectionery masses" are understood, in particular, the essential ingredients of many items of confectionery, for example, chocolate, pralines, delicately melting coatings, delicious sandwich spreads, fillings, and so on.

Up to the present time the focal point in production planning has mainly been on a high product throughput. Since in the event of a change of product the plant must be fully cleaned in each case, in order to eliminate product residues from the system, or the effects of cross-contamination, a lower variety of products has, in particular, been accepted. This not only reduces flexibility in the changeover of product lines, but also reduces the capacity of the plants, and thus the economic efficiency.

In comparison to the milk-processing industry, to the drinks industry, or even to the pharmaceutical industry, manufacturers of confectionery items have long enjoyed a clear advantage in terms of production that is demonstrably free of germs. Cocoa acts as an antioxidant, sugar as a natural preservative, and the water content of most confectionery masses is very low. As a result the possible risk of contamination of the products is extremely low. The result of this is, amongst other factors, that in comparison to many other industrial production processes, in the confectionery industry operation proceeds at high temperatures and in a dry environment. The dominant raw materials, such as sugar, cocoa and most fats, are fundamentally non-critical in microbiological terms.

Nevertheless, the modern consumer also places increased value on quality reliability in the case of emotionally charged confectionery products—both with regard to the raw materials, and even more with regard to the processing. For manufacturers, this means in particular that the demand for high-quality, hygienically processed products will increase. Furthermore, the requirements regarding transparent and complete information about the products and their manufacturing processes are also increasing. Furthermore, official monitoring bodies will be asked to assess the hygiene and quality in the production of confectionery masses more strictly in the future. In overall terms it can be assumed that the requirements for production plants will be higher than previously in the future.

Furthermore, the product ranges of the manufacturers continue to diversify while the respective production runs reduce in size. Accordingly, the efficiency and effectiveness of cleaning procedures and cleaning devices are becoming increasingly important. Conventionally, all the components of a plant must be taken apart, cleaned, dried and subsequently reassembled in the event of a product change. This is very intensive in terms of time and cost. In particular care must be taken to ensure that no moisture enters into the plant since this brings with it the risk of germ formation.

DE 19637098 A1 describes a device for the mixing and/or refinement of chocolate masses, Here a passage extending along its longitudinal axis, essentially exposed to the air, can be connected with the conching tank. In an extension of the said longitudinal axis a cleaning tool can be introduced into the passage.

DE 69002057 T2 describes a reactor for the treatment of fluid cocoa and its derivatives. In the reactor, the pump of the circulating devices is located outside the tank, and is driven by devices that are separate from the devices driving the rotating shaft. Furthermore, the circulating devices have a suction pipe, which connects the said outlet on the tank with the pump, and a feed pipe from the pump to the interior of the tank, and devices for introducing media into the liquid cocoa are connected with the said suction pipe. The said devices for the introduction of media can, in particular, have devices for the introduction of water or aqueous solutions, and/or devices for the introduction of air. In order to be able to empty the reactor easily, a particular type of embodiment provides for the pump to be reversible, for the first three-way valve to be arranged in the said suction pipe, and for the said feed pipe to cross a floor of the tank in the vicinity of a low point of this floor, and to have openings connecting with the interior of the tank, which enable the emptying by suction of the substances that have settled out at the said low point.

US 20050056707 A1 describes a nozzle attachment, especially for devices in food manufacture, with which any residual product present in a dispensing nozzle can be removed by means of a gas flow.

The object of the invention is to provide a plant and a method for the manufacture and/or preparation of confectionery masses, which enable an economic and hygienic production of even small quantities of confectionery masses.

SUMMARY

The above object is achieved by means of a plant for the manufacture and/or preparation of confectionery masses, and a method for the cleaning of such a plant.

BRIEF DESCRIPTION OF THE DRAWINGS

In what follows examples of embodiment will elucidate the invention and its advantages in more detail with the aid of the accompanying figures. The proportions of the individual elements relative to one another in the figures do not always correspond to the real proportions, since some forms are shown in a simplified manner, and other forms are enlarged relative to other elements for purposes of better illustration.

Identical reference symbols are used for elements of the invention that are the same, or operate in the same manner.

Furthermore, in the interests of clarity only those reference symbols are shown in the individual figures that are necessary for the description of the figure in question. The forms of embodiment shown represent just examples of how the inventive plant or the inventive method can be configured, and do not represent any definitive limitation.

DETAILED DESCRIPTION

Figure 1:
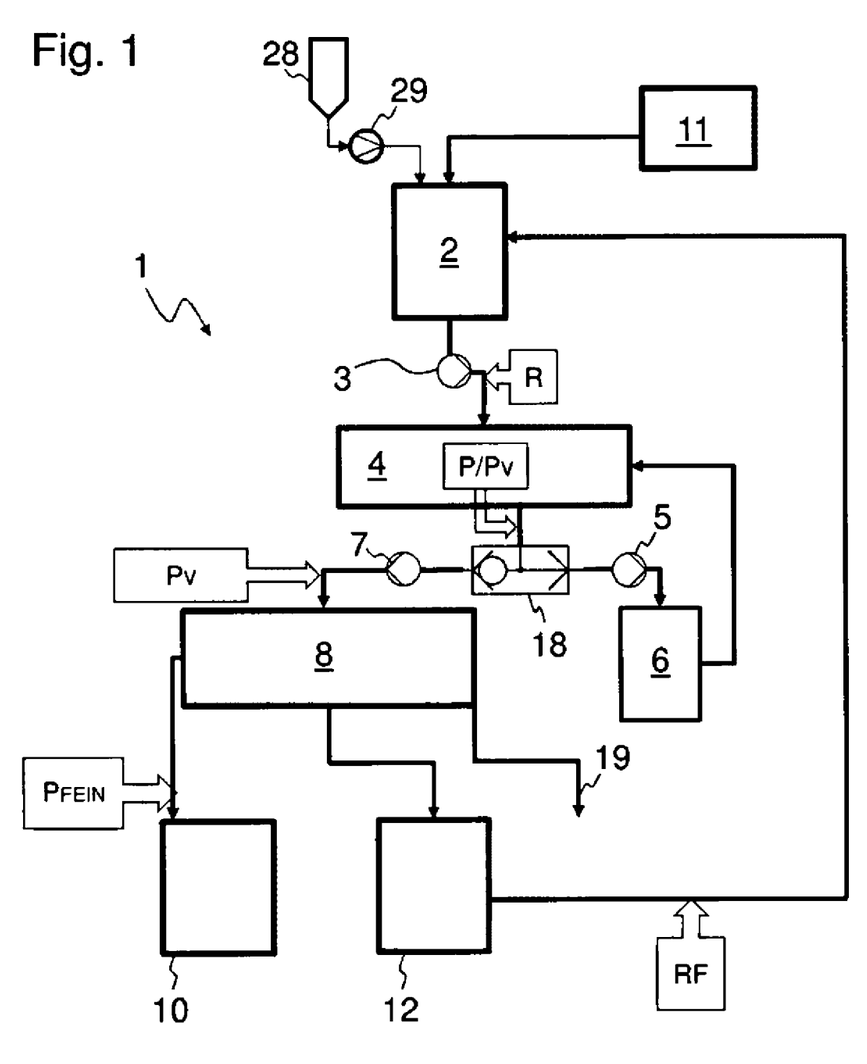
FIG. 1 shows a schematic overview of the components of an inventive plant.
Figure 2:
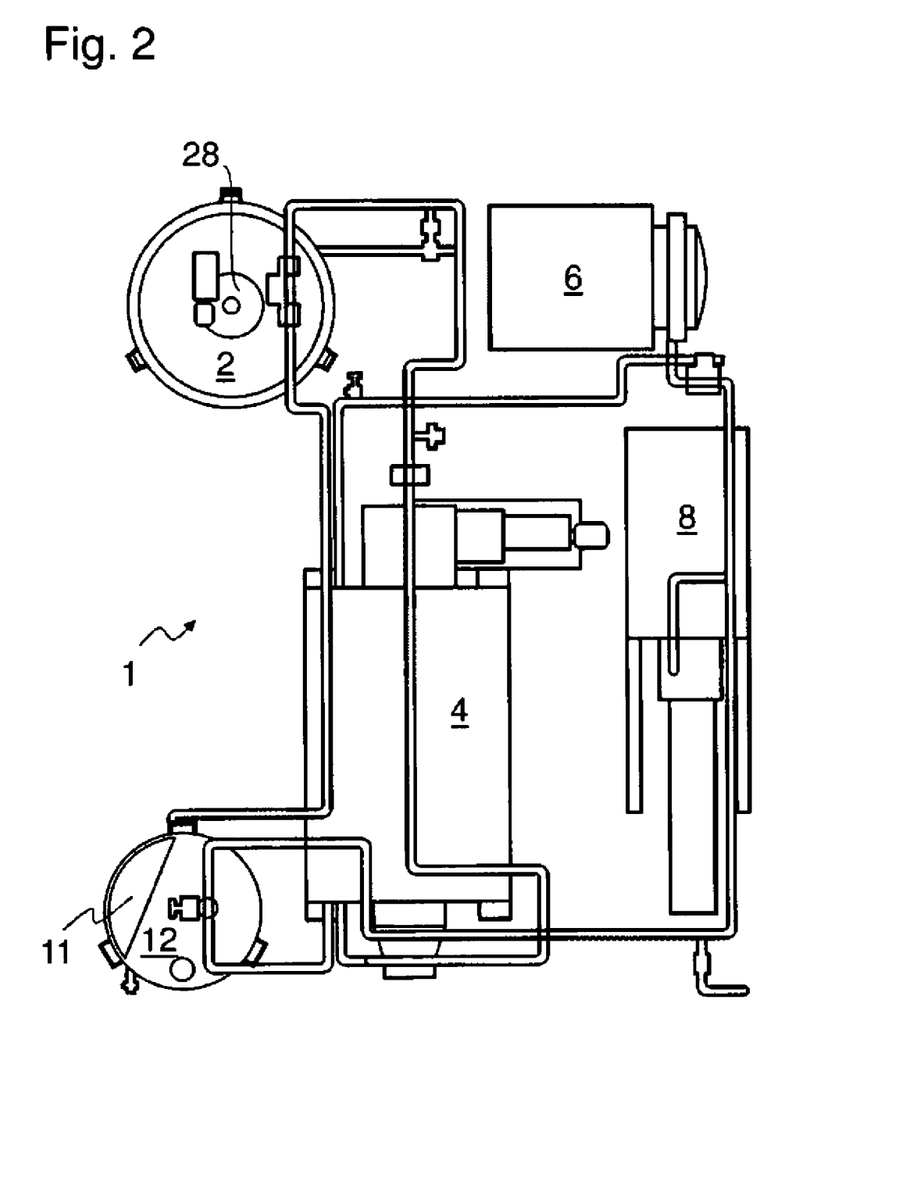
FIG. 2 shows a representation of an arrangement of the components of an inventive plant from above.
Figure 3:
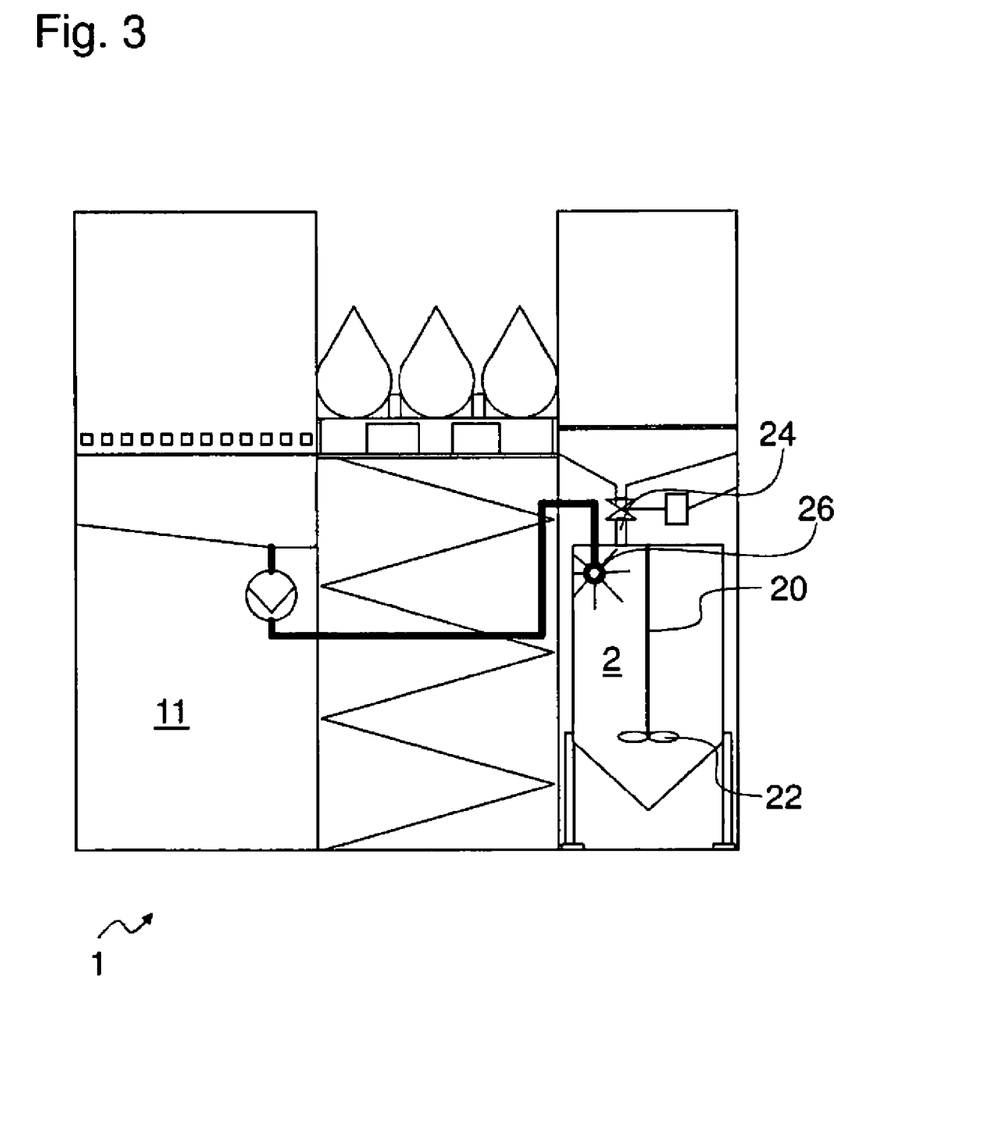
FIG. 3 shows a cross-section through an inventive plant.

FIG. 1 shows a schematic overview of the components of an inventive plant 1; FIG. 2 shows a representation of an arrangement of the components of an inventive plant 1 from above, and FIG. 3 shows a cross-section through an inventive plant 1.

The raw materials required for the product charge of the confectionery mass are poured into a charge tank, or mixing tank 2. In what follows the charge tank, or mixing tank 2 is identified only as a mixing tank 2. Here in particular, the fat is preheated and stored in a fat storage tank 11, before it is poured in liquid form into the mixing tank 2. The other raw materials, for example, granulated sugar, cocoa powder, milk powder, and so on, are preferably admitted in solid form, in particular in powder form. In the mixing tank 2 the raw materials are continuously and uniformly mixed with the heated fat that has been submitted. From an additional, separate and, if required, heatable storage tank 28, additives such as lecithin, or similar, can be admitted by means of a metering pump 29. After all the powder-form raw materials have been mixed into the fat the raw material mix R is transferred by means of suitable pumps 3 into a processing tank 4. In the processing tank 4 the mix that has been pumped in is maintained in continuous movement, in order to prevent the settling-out of granulated sugar or other coarse-grained components. As a result of the further mixing in the processing tank 4, the product mix P is formed.

As the next step in the process, refinement of the product mix P takes place, for example, by means of deaeration, and/or dehumidification, and/or degassing. In the example of embodiment represented refinement takes place by means of a thin-film deaerator or dehumidifier 6, by means of which water and/or volatile bitter substances are removed from the product mix P, such that a refined product Pv is formed. In a preferred form of embodiment the product mix P is passed through a thin-film deaerator/dehumidifier 6 for purposes of deaeration. For this purpose the product mix P is passed from the processing tank 4 through the thin-film deaerator/dehumidifier 6, in particular in a cyclic process. This occurs until the deaeration/degassing is completed, in combination with the desired maturing of flavour. For example, the product mix P is pumped by means of a suitable pump 5 from the processing tank 4 to the thin-film deaerator/dehumidifier 6, and is then conducted back again into the processing tank. Alternatively, the product mix P is pumped by means of a suitable pump 5 from the processing tank 4 to the thin-film deaerator/dehumidifier 6, and is then pumped, using a further pump (not represented), from the thin-film deaerator/dehumidifier 6 back to the processing tank 4.

From the already-described heatable storage tank 28 for additives such as, e.g. lecithin, additives can be admitted directly into the processing tank 4 using a separate pump 29*. The point in time of this admission of additives can be freely selected, and can, for example, take place only at the end of the process.

In a last step of the production process the refined product Pv is transferred from the processing tank 4 into an agitator bead mill 8. For example, the refined product Pv is pumped by means of a suitable pump 7 into the agitator bead mill 8. In accordance with one form of embodiment a switching valve 18 is arranged between the processing tank 4 and the thin-film deaerator/dehumidifier 6, or the agitator bead mill 8, such that the product mix P, that is to say, the (partially) refined product Pv is supplied either to the thin-film deaerator/dehumidifier 6, or to the agitator bead mill 8. A sensor can, for example, be assigned to the switching valve 18; this measures certain product properties, whereby a control unit (not represented) controls the switching valve 18 and sets it accordingly. The desired final fineness of the refined product Pv is produced in the agitator bead mill 8.

The product $P_{FINE}$ with the desired final fineness is transferred onwards into an external finished product tank 10. This can take place, for example, by means of a pump (not represented).

Figure 4:
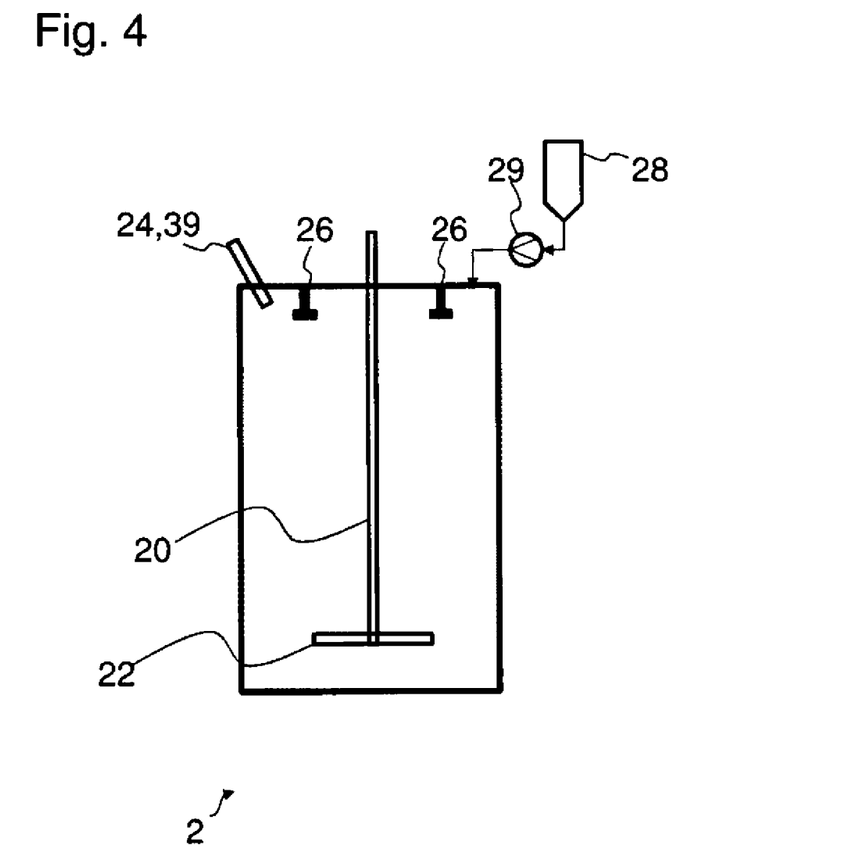
FIG. 4 shows a schematic representation of a charge tank, or mixing tank.

FIG. 4 shows a schematic representation of a mixing tank 2. From the fat storage tank 11 (compare FIGS. 1 to 3) the liquid fat is conducted, that is to say, pumped, into the charge tank, or mixing tank 2, via at least one spray head nozzle 26 on the cover of the latter. By this means an initial cleaning of the mixing tank 2 is achieved at the start of each new charge. A proportion of the fat required for the charge is held back for a following intermediate cleaning step. A mixing disk, or dissolver disk 22 is in motion in the mixing tank 2; this continuously and uniformly mixes the raw materials that are subsequently added with the heated liquid fat that has been submitted.

From an additional, separate (heatable) storage tank 28, additives such as lecithin or other additives can be admitted by means of a metering pump 29. This can take place automatically in accordance with a selected recipe. The powder-form raw materials are poured into the mixing tank, which is partially filled with fat via a raw material inlet 24. The latter can, in particular, take the form of an extension of the charge hopper 39, already described in the context of FIGS. 2 to 4. By virtue of the option of separate charging of powder-form raw materials and liquid raw materials containing fat and additives, encrustations and/or agglutinations on the charge stations 35, 36 are effectively prevented. The charging of the additives from the additional storage tank 28 can either take place under the control of a program, or manually by means of the operator B.

After all the powder-form raw materials in the mixing tank 2 have been mixed into the fat the so-called raw material mix R is transferred by means of pumps 3 into the processing tank 4. After the raw material mix R has been transferred from the mixing tank 2 into the processing tank 4, a residual quantity of fat that has been held back is introduced via the cleaning nozzles 26 into the mixing tank 2 and is then pumped onward into the processing tank 4. With this small residual quantity of fat final raw material components are transferred from the mixing tank 2 into the processing tank 4 (compare FIG. 9) and at the same time, an intermediate cleaning of the mixing tank 2 is executed. By mixing together the raw material mix R and the residual quantity of fat in the processing tank 4 the product mix P is obtained.

Figure 5:
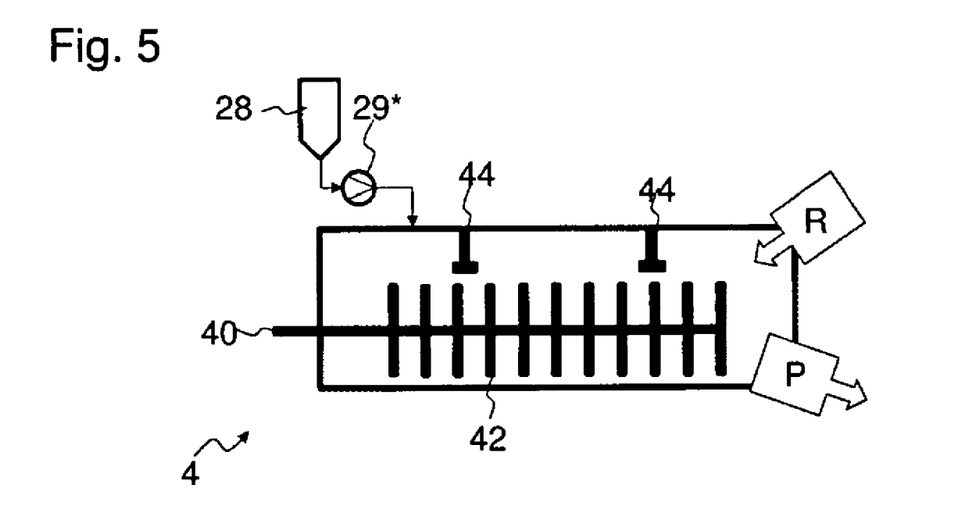
FIG. 5 shows a schematic representation of a processing tank.

FIG. 5 shows a schematic representation of a processing tank 4. In the processing tank 4 is arranged at least one mixing shaft 40, which continuously maintains the pumped-in raw material mix R and the residual quantity of fat in motion, and mixes them into a product mix P. Moreover, by virtue of the continuous motion any settling-out of granulated sugar, or other coarse-grained components, of the product mix P is avoided.

The last step in the production process consists in producing the desired final fineness for the refined product Pv from the processing tank 4 (compare also the description relating to FIG. 1). For this purpose the refined product Pv is transferred into an agitator bead mill 8, as is represented, for example, in FIG. 6. To this end, a certain quantity of the refined product Pv is poured into the agitator bead mill 8, until a small quantity of the refined product Pv exits from the material outlet 86 of the agitator bead mill 8. This is measured by means of sensors 88. The most important measured quantity in this case is the temperature, since the product exit temperature downstream of the mill is higher than the entry temperature (a temperature of between 40° and 60°). In the filled state the agitator bead mill 8 runs for a predetermined time without further refined product Pv being pumped in, or refined product Pv located in the agitator bead mill 8 being pumped out. After the prescribed time the refined product Pv thus achieves its desired final fineness. After this time the product $P_{FINE}$ is conducted onward into the external finished product tank 10 (compare FIG. 1). At the same time, the supply of non-ground refined product Pv from the processing tank 4 is pursued.

Figure 6:
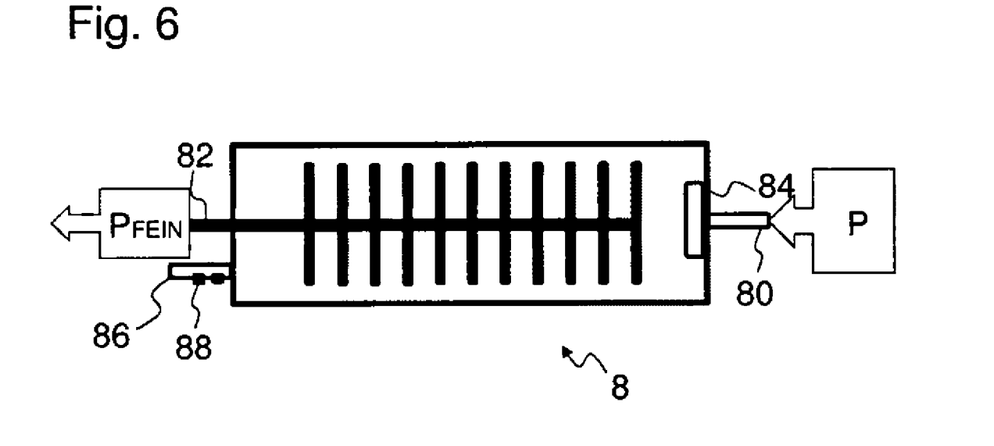
FIG. 6 shows a schematic representation of an agitator bead mill.

As a result of this procedure the quantity of refined product Pv that, by virtue of altering operational conditions in the start-up phase, does not yet correspond to the required quality is reduced, and the grinding process can thus be executed without significant losses, that is to say, without significant quantities of waste. In a further form of embodiment it is possible, as in conventional methods, to drive the product $P_{FINE}$ that is to be ground through a circuit. In the inlet region 80 of the agitator bead mill 8 there is located an initial reduction module 84 for purposes of the initial reduction of coarse products, which is even able to reduce nuts, or broken biscuits, or similar, and to adjust them to the optimal entry fineness of the agitator bead mill 8.

A further important function of the plant 1 is the option of cleaning the plant 1 completely without having to disassemble the latter. For the cleaning process a certain quantity of fat is pumped from the fat storage tank 11 into the mixing tank 2. The pumping-in takes place via at least one spray head 26 arranged in the cover of the mixing tank 2, whereby all encrustations located in the mixing tank 2, on the cover and/or on the sidewalls, can be washed off. After the washing of the mixing tank 2 the fat used is introduced into the processing tank 4 via the normal production path. The processing tank 4 also has at least one, preferably at least two, spray heads 44, by means of which the whole of the processing tank 4 can be sprayed, and thus cleaned. The fat from the processing tank 4 can then, for cleaning purposes, be passed either via the thin-film deaerator/dehumidifier 6 and/or via the agitator bead mill 8. In particular, this can be controlled by means of the switching valve 18. When the cleaning operations are complete the operator B can decide as to whether the fat is pumped out via a separate waste pipe 19 for purposes of waste disposal, or whether it is introduced into a so-called residual mass tank 12 (compare FIG. 1). The fat RF located in the residual mass tank 12, which is contaminated with small quantities of the product, can be used for a new production batch.

In order to be able to clean the individual pipes of the plant 1 connecting the product-processing devices between the individual steps in the method, and following a production run, the system also has at its disposal a cleaning system with cleaning elements. With the aid of the cleaning elements high-viscosity liquids, pasty media, also powders and granulates, can be removed from the pipes without almost any residue. Here an approximately spherical cleaning element, waisted in the centre, can be pushed through the pipe system using water or compressed air. The cleaning element has, at least in some regions, a cross-sectional area that substantially corresponds to the cross-sectional area of the pipes, so that the cleaning element is arranged in the pipe without any clearance, or with only a small clearance. The cleaning element pushes the medium that is to be removed out of the pipe in front of it. The cleaning elements deployed are plastic bodies of variously shaped material, which fit exactly into the pipes, and are driven through the latter using compressed air. Here sealing lips fit closely against the pipe walls, and the cleaning element pushes in front of it any residual product and/or fat that may be present in the pipes as far as the next product-processing device. The material, which is pushed by the cleaning element, for example, into the agitator bead mill 8, can also be pushed out of the agitator bead mill 8 by means of the process air, with which the cleaning element can be moved.

Connecting pipe circuits are preferably provided, for example, a first connecting pipe circuit is provided between the mixing tank 2 and the processing tank 4. A second ring circuit can be provided between the processing tank 4 and the thin-film deaerator/dehumidifier 6. The function is described in an exemplary manner for the first connecting pipe circuit between the mixing tank 2 and the processing tank 4. The cleaning element is pushed through the pipe between the mixing tank 2 and the processing tank 4, and thereby pushes residual product in front of it, which is transferred into the processing tank 4, for example through openings in the connecting pipe, while the cleaning element is passed onward into its parking position, which is preferably assigned to the mixing tank 2. In particular a first connecting pipe between the mixing tank 2 and the processing tank 4 is cleaned using a first cleaning element after each step in the production process, and a second connecting pipe between the processing tank 4 and the thin-film deaerator/dehumidifier 6 is cleaned using a second cleaning element Since the cleaning element cannot pass around corners, the connecting pipes are fitted with appropriate curves, on which any settling-out of the product is already made more difficult by virtue of the shape, in particular in conjunction with an anti-stick surface.

Figure 7:
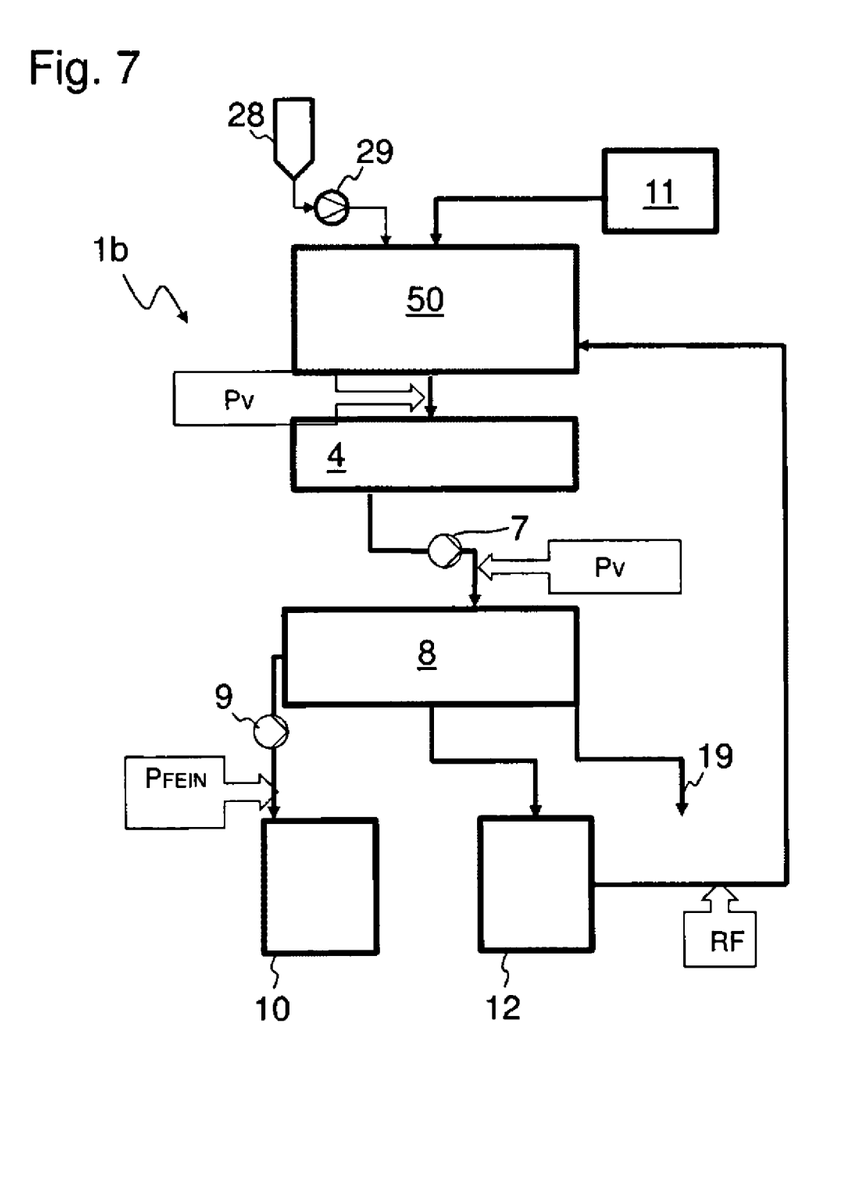
FIG. 7 shows a schematic overview of the components of a further form of embodiment of an inventive plant.

FIG. 7 shows a schematic overview of the components of a further form of embodiment of an inventive plant 1b. This differs from the previously described plant 1 in that a conching device 50 is employed for purposes of processing chocolate masses and high-quality ingredients instead of the mixing tank 2 and the thin-film deaerator/dehumidifier 6. With this a particularly intensive mixing of the masses is possible, together with the adjustment of the rheology, i.e. the deformation and flow characteristics of the mass, and the taste. Here the addition of the raw materials and/or additives into the conching device 50 takes place, in which then also the adjustment of the desired rheological properties and the taste takes place. Here too the above-described principle of using spray heads for the addition of liquefied fat components can be applied.

From the conching device 50 the product Pv is then either driven in a passage through an agitator bead mill 8, or in a circuit in order to achieve the desired final fineness $P_{FINE}$. For purposes of increasing the production capacity an intermediate tank can be used. For example a processing tank is optionally present in order to increase the throughput of the plant 1b. In particular, part of the product Pv produced by means of the conching device 50 can be intermediately stored in the processing tank 4, while another part is already being ground further in the agitator bead mill 8. The finished conched mix Pv can then either be pumped from the processing tank 4 either in a passage (as described above), or in a circuit, for purposes of being ground by the agitator bead mill 8, in order to achieve the desired final fineness $P_{FINE}$.

The above-described option of initial cleaning, intermediate cleaning and final cleaning by the deployment of spray nozzles, the holding back of a quantity of residual fat, and by the use of fat as a cleaning agent, can be executed in an analogous manner in this form of embodiment. In particular, by virtue of the significantly fewer number of individual machines, cleaning of the plant 1b with the conching device 50 becomes simpler than in the case of the plant 1 described in FIGS. 1 to 11. In an analogous manner to the first form of embodiment described, the deployment of spray nozzles (26, 44, compare FIGS. 4 and 5) is possible, as is the deployment of the above-described cleaning technology, with cleaning elements within the connecting pipes of the plant 1b.

The invention has been described with reference to a preferred form of embodiment. However, for a person skilled in the art, it is conceivable that variations or alterations can be made to the invention, without thereby leaving the scope of protection of the following claims.

What is claimed is:

1. A method for cleaning a plant configured to manufacture confectionery masses from at least one liquid raw material and granular and/or powder form raw materials, the plant having at least one mixing tank and a processing tank, the mixing tank having at least one inlet, an outlet, and a mixing device for mixing the raw materials to form a raw material mixture, the method comprising:
    providing a first spraying device in an upper region of the at least one mixing tank and providing a second spraying device in an upper region of the processing tank, the first spraying device being directed, at least in some regions, in a direction of an interior wall surface of the mixing tank;
    transferring the raw material mixture through the outlet from the mixing tank to the processing tank and maintaining the raw material mixture in motion to at least minimize settling of coarse-grained components within the processing tank;
    supplying a first residual quantity of the liquid raw material into the mixing tank via the first spraying device to clean the mixing tank;
    transferring the first residual quantity onward through the outlet to the processing tank and mixing the first residual quantity with the raw material mixture to produce a product mix; and
    supplying a second residual quantity of the liquid raw material into the processing tank via the second spraying device to clean the processing tank after the product mix has been transferred out of the processing tank.

2. The method in accordance with claim 1, wherein the second residual quantity of the liquid raw material is sprayed into and/or flows through the processing tank of the plant.

3. The method in accordance with claim 1, wherein the first residual quantity of the liquid raw material is sprayed onto the interior wall surface of the mixing tank so that the interior wall surface is wetted with the liquid raw material, and/or the second residual quantity of the liquid raw material is sprayed onto an interior wall surface of the processing tank so that the interior wall surface is wetted with the liquid raw material.

4. The method in accordance with claim 1, wherein the first residual quantity of the liquid raw material used to clean the mixing tank is transported from the mixing tank to the processing tank through a connecting pipe, and
    wherein the method further comprises passing a cleaning element through the connecting pipe to remove any residue within the connecting pipe.

5. The method in accordance with claim 4, wherein the step of passing the cleaning element through the connecting pipe comprises pushing the cleaning element using a cleaning liquid or compressed air.

6. The method in accordance with claim 4, wherein the cleaning element has a cross-sectional area that corresponds to a cross-sectional area of the connecting pipe.

7. The method in accordance with claim 4, wherein the cleaning element is configured to push any residue within the connecting pipe into the processing tank.

8. The method in accordance with claim 4, wherein the step of passing the cleaning element through the connecting pipe is performed after each step in a production process.

9. The method in accordance with claim 1, wherein the first residual quantity of the liquid raw material used as a cleaning agent is transported in a circuit through the mixing tank and/or the second residual quantity of the liquid raw material used as a cleaning agent is transported in a circuit through the processing tank.

10. The method in accordance with claim 1, wherein the mixing tank and/or the processing tank is sprayed with at least one additional quantity of the liquid raw material used as a cleaning agent, and wherein the at least one additional quantity of the liquid raw material is subsequently supplied to a refining device in the plant to clean the refining device.

11. The method in accordance with claim 10, wherein the least one additional quantity of the liquid raw material used as a cleaning agent is conducted in a circuit between the mixing tank and/or the processing tank and the refining device, and
    wherein after each pass of the liquid raw material between the mixing tank and/or the processing tank and the refining device, a cleaning element passes through a connecting pipe in the circuit and purges the connecting pipe.

12. The method in accordance with claim 10, wherein the first residual quantity, the second residual quantity, and/or the at least one additional quantity of the liquid raw material used as a cleaning agent is conducted multiple times in a circuit through a grinding device, or is conducted through the grinding device and collected in a residual mass tank, or is conducted through the grinding device and removed from the plant.

13. The method in accordance with claim 1, wherein the processing tank receives the raw material mixture from the mixing tank to produce a refined confectionary product.

14. The method in accordance with claim 1, wherein the plant includes a deaerator and/or dehumidifier configured to refine the product mix, and
    wherein the method further comprises passing the second residual quantity of the liquid raw material to the deaerator and/or dehumidifier for cleaning the deaerator and/or dehumidifier.

15. The method in accordance with claim 14 wherein the plant includes a bead mill configured to produce a desired fineness for the product mix, and
    wherein the method further comprises passing the second residual quantity of the liquid raw material to the bead mill for cleaning the bead mill.

16. The method in accordance with claim 1, further comprising pumping out the second residual quantity of the liquid raw material via a waste pipe after cleaning the processing tank.

17. The method in accordance with claim 1, further comprising transferring the second residual quantity of the liquid raw material into a residual mass tank.

18. The method in accordance with claim 17, further comprising using the second residual quantity of the liquid raw material contained in the residual mass tank for a new production batch.

19. A method for cleaning a plant configured to manufacture confectionery masses from at least one liquid raw material and granular and/or powder form raw materials, the plant having at least one mixing tank, a processing tank and a production path connecting the tanks, the mixing tank having at least one inlet, an outlet, and a mixing device for mixing the raw materials to form a raw material mixture, the method comprising:
- pumping the raw material mixture out of the outlet of the mixing tank, through the production path, and into to the processing tank, which is configured to maintain the raw material mixture in motion to at least minimize settling of coarse-grained components;
- supplying a first residual quantity of the liquid raw material into the mixing tank via a first spraying device to clean the mixing tank, the first spraying device being positioned in an upper region of the at least one mixing tank and being directed in a direction of an interior wall surface of the mixing tank;
- pumping the first residual quantity onward through the same production path to the processing tank, which mixes the first residual quantity with the raw material mixture to produce a product mix;
- supplying a second residual quantity of the liquid raw material into the processing tank via a second spraying device to clean the processing tank after the product mix has been transferred out of the processing tank, the second spraying device being positioned in an upper region of the processing tank; and
- transferring the second residual quantity of the liquid raw material into a waste pipe so that the second residual quantity is disposed as waste or into a residual mass tank so that the second residual quantity is stored for use in a later production batch.

20. The method in accordance with claim 19, wherein the plant comprises a refining device positioned downstream of the processing tank, and
wherein the method further comprises passing the second residual quantity of the liquid raw material from the processing tank to the refining device to clean the refining device.

* * * * *